GAPLESS MAGNETIC HEAD

Filed Oct. 2, 1962 2 Sheets-Sheet 1

INVENTOR.
RICHARD B. LAWRANCE
BY
Fred Jacob
ATTORNEY

INVENTOR.
RICHARD B. LAWRANCE
BY Fred Jacob
ATTORNEY 3,314,056
GAPLESS MAGNETIC HEAD
Richard B. Lawrance, Winchester, Mass., assignor to Honeywell Inc., a corporation of Delaware
Filed Oct. 2, 1962, Ser. No. 227,931
12 Claims. (Cl. 340—174.1)

The present invention relates in general to new and improved data transfer apparatus, in particular to magnetic transducer heads for use with a magnetic storage medium to effect a data transfer therebetween.

Presently available magnetic transducer heads usually consist of a pair of pole pieces formed from a magnetic material of high permeability. The pole pieces are positioned in mirror-image relationship with respect to each other, the ends of the pole pieces in the base portion of the core abutting along a common surface. A non-magnetic shim spacer is positioned between the pole faces to form a gap opposite the aforesaid abutting pole piece ends. When a flux is induced in the core, e.g. by energizing a winding carried on one of the pole pieces, the presence of the non-magnetic shim spacer forces the flux lines out of the core in the vicinity of the gap. If a magnetic storage medium such as magnetic tape is positioned nearby, some of these fringing flux lines will complete their path through a portion of the medium in the vicinity of the gap to effect a recording.

Magnetic core gaps in themselves present certain disadvantages. The structural weakness of the core due to the presence of sharp edges at the gap often results in chipping of the core. When this occurs, the flux resolution is seriously impaired and data may be lost as a result. Even where chipping has not taken place, the surface which is presented to the magnetic storage medium, referred to as the data transfer surface hereinbelow, contains discontinuities. Any dirt particles caught between the data transfer surface and the moving storage medium may cause serious damage to both.

The non-magnetic shim spacer is ordinarily fastened to the pole faces by means of an adhesive or by clamping means. The possibility of the shim spacer being loosened cannot be discounted. The damage to the magnetic head under these circumstances may be sufficiently great to render it unusable. Tape damage may also be severe under these conditions, resulting in the loss of a portion of the stored data.

Where a pair of pole pieces is used for the core, the dimensions of the individual pole pieces must be machined to close tolerances. The pole pieces must be accurately positioned with respect to each other in order to obtain the desired performance. Thus, the surface at the ends of the respective pole piece ends must abut properly so that the reluctance placed into the flux path is small and so that the magnetic recording will be precisely positioned on the medium. The machining of the pole pieces must also make allowance for the thickness of the shim metal which is inserted between the pole faces opposite the aforesaid abutting surfaces. The process of assembling the pole piece pair is necessarily a time-consuming one since close tolerances must be observed. The problem is compounded where the core is built up of laminations. In such a case, special lugs with guide holes may be required to aid in the assembly operation and may form part of the pole piece laminations.

It is a primary object of the present invention to provide data transfer apparatus which is not subject to the foregoing disadvantages.

It is another object of the present invention to provide a magnetic transducer head which presents a continuous surface to the magnetic storage medium.

It is a further object of the present invention to provide a magnetic transducer head which is simple and economical to construct and assemble.

It is an additional object of the present invention to provide an improved method for manufacturing magnetic transducer heads.

The invention which forms the subject matter of the present application employs a continuous core of a high-permeability magnetic material, the latter property typically being in evidence when the core material displays a relatively perfect physical and chemical arrangement of atoms. By suitably treating a restricted region of the core, the aforesaid arrangement is disturbed so as to significantly diminish the magnetic properties in the region. Thus, a limited region of low permeability is provided which is equivalent to the presence of a gap in the core. The unitary core construction made possible by this process permits a simple assembly operation, particularly where core laminations are used. Prior to threading the assembled laminations with a winding, they are machined in the vicinity of the aforesaid region of low permeability in order to present a smooth data transfer surface.

The various novel features which characterize the invention are pointed out with particularity in the claims annexed to and forming a part of this specification. For a better understanding of the invention, its advantages and specific objects thereof, reference should be had to the following detailed description and the accompanying drawings in which:

Figure 1:
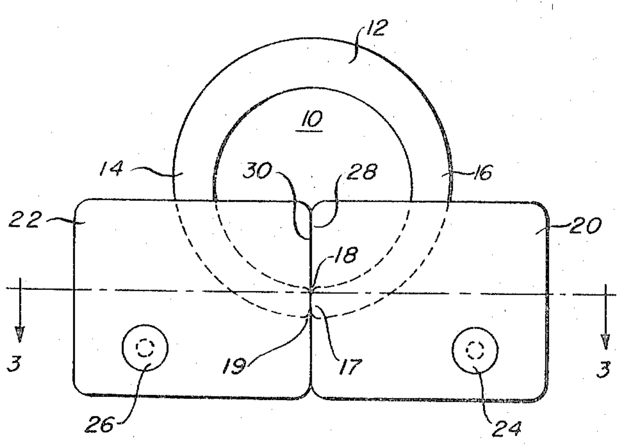
FIGURE 1 is an elevation view of a preferred form of a continuous core for a magnetic transducer head and further illustrates means for treating the same.
Figure 2:
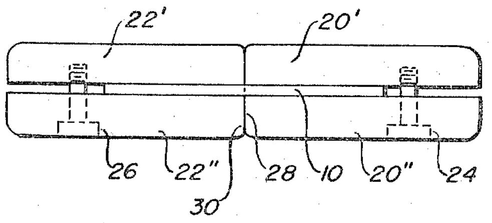
FIGURE 2 is a plan view of the apparatus of FIGURE 1.

With reference now to the drawings, FIGURE 1 illustrate a continuous magnetic core 10 held by a pair of clamps 20 and 22. The core is seen to have a base portion 12, a pair of leg portions 14 and 16, each joined to the base portion at one end and a core region 17 which has a constricted cross-section defined by a pair of notches 18 and 19. The region 17 connects the other ends of the leg portions 14 and 16. As will appear more clearly from FIGURE 2, each clamp consists of two parts, i.e. 20′, 20″ and 22′, 22″. Tightening means typified by a pair of bolts 24 and 26 are adapted to tighten the clamps 20 and 22 respectively. A pair of surfaces 28 of the clamp 20 abuts a corresponding pair of surfaces 30 of the clamp 22. The center of the constricted region 17 coincides with the abutting surfaces 28 and 30 respectively of the two clamps.

Figure 3:
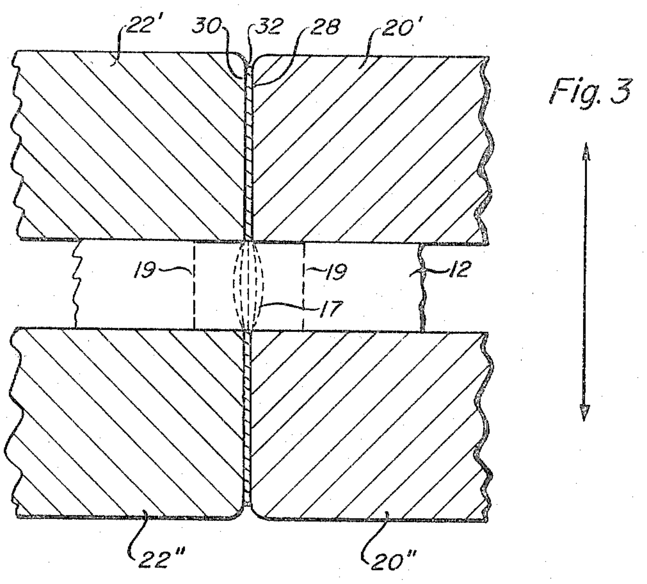
FIGURE 3 is a cross-sectional view of the apparatus of FIGURE 1 taken along the line 3—3.

FIGURE 3 illustrates a cross-sectional view of the apparatus of FIGURE 1 taken along the line 3—3. The core 12 is seen to be clamped between the sections 20' and 20'' of one clamp and the sections 22' and 22'' of the other clamp. In FIGURE 3, the notch 19 is defined by a pair of dotted lines centered about the region of constricted cross-section 17. A film 32 of a suitable lubricant is placed between the surfaces 28 and 30 of the clamps 20 and 22 respectively.

Prior to being treated, the crystals of the magnetic material in the core region 17 are large and unstrained as in the remainder of the core, typical of a high-permeability material. In the illustrated embodiment of the invention, shear forces are repeatedly applied to the region 17 in opposite directions transverse to the plane defined by the core loop. The application of the shear forces is effected by moving one of the clamps, e.g. the clamp 20, back and forth in the direction of the double-headed arrow with respect to the other clamp. The lubricating film 32 between the surfaces 28 and 30 facilitates the relative clamp movement by lessening the frictional drag between the surfaces.

Because of the constricted cross-section of the region 17, the stresses are concentrated there and serve to strain its existing crystalline structure. As a consequence, dislocations of the crystal grains occur and the permeability of the region is lowered. The crystalline structure outside the region 17 remains substantially unaffected by the relative clamp movement and its crystal texture is then relatively coarse and unstrained with respect to the texture in the region 17. Thus, an abrupt change of permeability is encountered when the boundaries of the region 17 are traversed by a magnetic flux in the core.

Figures 4, 5, 6:
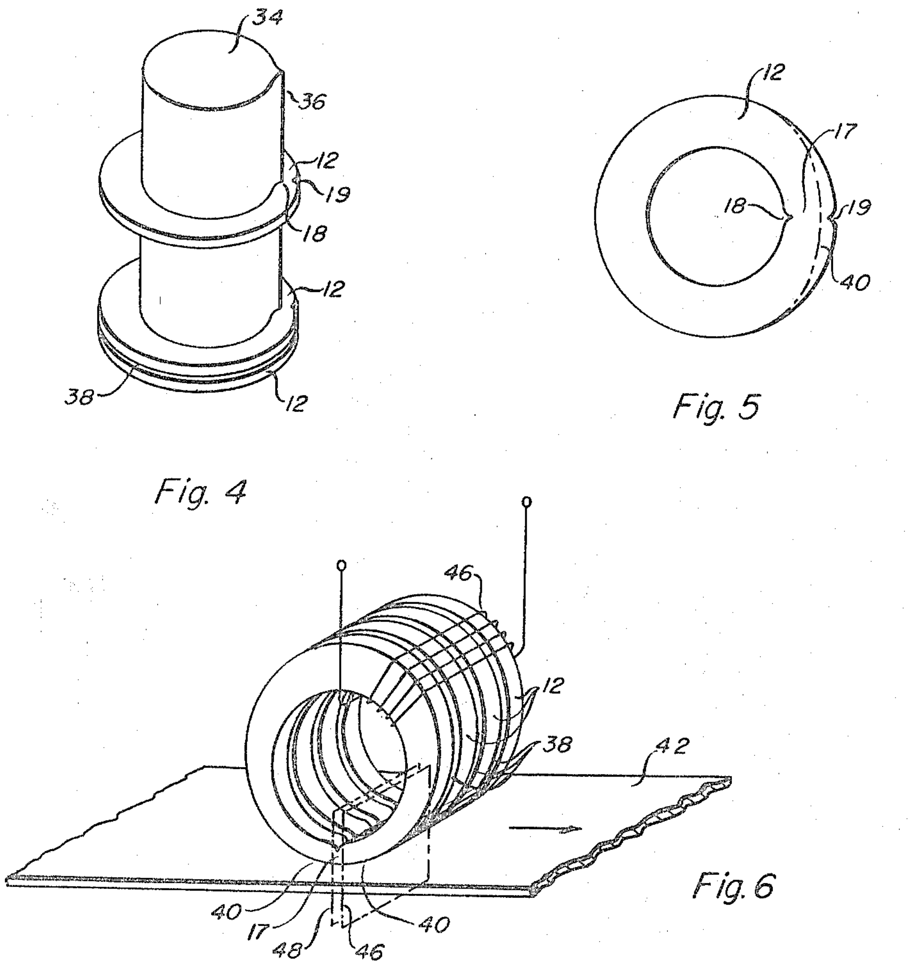
FIGURE 4 illustrates a step in the assembly operation of the treated core laminations.
FIGURE 5 illustrates a step in the process of machining a treated core.
FIGURE 6 illustrates an assembled transducer head in operation position.

If the core consists of a plurality of laminations, each lamination receives the same treatment. The laminations are then assembled as illustrated in FIGURE 4. A special form 34 may be employed for this purpose which mates with the central core apertures of the loop defined by each lamination. It will be noted that the form 34 includes a ridge 36 which engages the internal notch 18 of each core lamination. Thus, the laminations are keyed to the form 34 and they are readily positioned without the necessity of taking special precautions to observe close tolerances in the assembly operation of the transducer head. As each core lamination is placed into position, it is glued to the lamination below it by means of a thin layer of adhesive 38. The latter further provides the necessary electrical insulation between the respective laminations. The completed assembly may be encapsulated for greater strength and for protective purposes.

FIGURE 5 illustrates a core 12 after it has been treated to provide low permeability in the region 17. In order to remove the discontinuity provided by the notch 19 and to obtain a continuous surface, the core must be machined. In a preferred method, the excess metal is removed by grinding to a surface defined by the line 40. Thereafter lapping and polishing is carried out in order to form a smooth continuous data transfer surface which is adapted to be presented to a magnetic storage medium. It will be noted that the region 17, whose permeability is low relative to that of the remainder of the core, is centrally located with respect to the data transfer surface 40. If desired, the form 34 which engages the interior notch 18 during the assembly of the core laminations, may be employed during the machining process. In this manner, all the core laminations can be machined simultaneously.

FIGURE 6 illustrates a preferred embodiment of the assembled magnetic transducer head which is included in the subject matter of the present invention. The head is shown positioned in operating relationship with respect to a magnetic tape storage medium 42. The transducer head is seen to comprise a plurality of core laminations 12, each insulated from the next one by an adhesive film 38. A winding 46 is disposed on the core laminations 12 and is threaded through the central aperture which is jointly defined by the core laminations.

As explained above, the core laminations are substantially identical and are so assembled that corresponding core portions are superposed with respect to each other. In the instant case, the regions of constricted cross-section 17 of the respective core laminations are so positioned with respect to each other as to define a common data transfer area of the transducer head. In FIGURE 6, this data transfer area is schematically represented as contained between a pair of planes 46 and 48. It will be noted that the data transfer area constitutes a portion of the previously machined surface 40.

In operation, when the terminals of the magnetic head winding 46 are energized, a flux is induced in the magnetic path defined by each of the core laminations 12. The high permeability of these core laminations provides a path of relatively low reluctance. In the vicinity of the data transfer area 17 where the core permeability is low and where, in addition, the cross-section is reduced, the flux is forced out of the core laminations and traverses the proximate portion of the magnetic tape 42 before returning to the core laminations. As a consequence, a signal will be recorded on the magnetic tape. It will be clear that the unbroken surface which is presented to the magnetic tape by the transducer head permits the tape to ride in contact with the head without danger to either.

Figure 7:
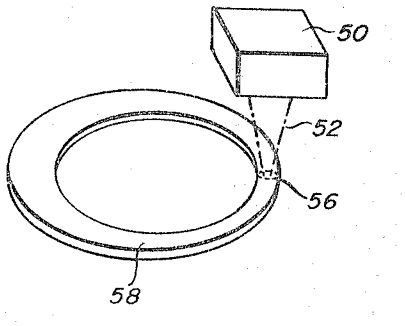
FIGURE 7 illustrates a further method of treating a continuous magnetic core.

FIGURE 7 illustrates another method of treating a limited region of a high permeability magnetic core to decrease the permeability in that region. A neutron source 50 provides a focused neutron beam 52 which is directed onto a region 56 of a magnetic core 58. The impact of the neutrons serve to strain the existing crystal structure in the region 56 without affecting the crystal structure in the remainder of the core. The neutron bombardment may also produce a transmutation whereby some of the atoms of the core material undergo nuclear changes. In both cases the magnetic properties of the core materials in the treated region are affected. It will be noted that since a stress concentration is not required, as was the case in the embodiment of the invention described above, the core region 56 is not defined by notches. It may, however, be convenient to provide a constricted cross-section for the purpose of controlling the core inductance. The core 58 may be simply formed by stamping and a minimum of machining is required in order to prepare a proper data transfer surface which is adapted to be presented to a magnetic storage medium. If desired, an interior notch may be incorporated in the vicinity of the data transfer region in order to aid in the assembly of the respective core laminations, as pointed out in connection with FIGURE 4.

Various core materials may be employed for the present invention. Where the method of manufacture follows the steps illustrated in FIGURES 1–3, a flexible magnetic material such as permalloy is preferred. Where the material is treated by means of neutron bombardment flexibility is not required.

The assembly of the respective core laminations may be carried out in various ways. For example, in place of the form 34 shown in FIGURE 4, a pair of V-blocks could be employed which engage the notches 18 and 19 in order to align the respective core laminations. Various modifications are also possible in the general shape of the core laminations, provided only that a continuous loop exists in order to establish a closed flux path. The core laminations may be formed by any suitable manufacturing method.

Various other methods of treating a restricted region of a high-permeability magnetic core may be employed in order to significantly diminish the magnetic properties in that region. For example, atomic changes may be effected by heat-treating the aforesaid restricted core region. Alternatively, foreign atoms may be injected by a diffusion process limited to the region. In either case, the existing arrangement is altered sufficiently to produce low permeability in the region.

It will be apparent from the foregoing disclosure, that numerous modifications, changes and equivalents will now occur to those skilled in the art, all of which fall within the true spirit and scope contemplated by the invention.

What is claimed is:

1. A transducer head comprising a continuous closed-loop core consisting entirely of a magnetic material, said core further comprising a narrow cross-sectional region including at least a portion of an external surface adapted to be presented to a magnetic storage medium, and means for inducing a magnetic flux flow in said core, the core material in said cross-sectional core region having a permanently low actual permeability with respect to the remainder of said core adapted to force said flux outward with respect to said core in the vicinity of said external surface portion.

2. A transducer head comprising a continuous core, said core consisting of a magnetic material having a crystalline structure adapted to give it a high permeability, an external surface on said core adapted to be presented to a magnetic storage medium, the material of said core further comprising a limited cross-sectional region including a portion of said external surface, the crystalline structure of said core material changing abruptly at the limits of said region to provide a permanently low permeability in the latter between areas of permanently high permeability.

3. Data transfer apparatus comprising a continuous core, said core consisting of a magnetic material having a relatively coarse crystal texture adapted to provide high permeability, an external surface on said core adapted to be presented to a magnetic storage medium, and a limited data transfer region in said core including a portion of said external surface, the core material in said data transfer region having a relatively fine crystal texture adapted to provide a permanently low permeability in said region.

4. Data transfer apparatus comprising a continuous core, said core consisting of a magnetic material of a relatively unstrained crystal structure adapted to provide high permeability, an external surface on said core adapted to be presented to a magnetic storage medium, and a limited data transfer region in said core including a portion of said external surface, the core material in said region having a relatively strained crystal structure adapted to provide a permanently low permeability.

5. Data transfer apparatus comprising a continuous core, said core consisting throughout of a magnetic material having a crystalline structure, and a limited data transfer region in said core, said data transfer region having a permanently different crystal texture from the remainder of said core to provide low permeability in said region relative to the remainder of said core.

6. Data transfer apparatus comprising a continuous core, said core consisting entirely of a magnetic material having a crystalline structure, and a limited data transfer region in said core, the crystalline structure of the core material in said region permanently being relatively strained with respect to the remainder of said core to provide low permeability therein relative to the remainder of said core.

7. Data transfer apparatus comprising a continuous core consisting entirely of a core material having a crystalline structure, and a limited data transfer region in said core, the core material external to said data transfer region displaying a high permeability, the core material in said region having a relatively imperfect permanent arrangement of atoms to provide significantly diminished magnetic properties therein with respect to the remainder of said core.

8. In a transducer head for use with a magnetic storage medium to transfer data therebetween, a continuous core consisting of the same magnetic material having a crystalline structure, said core comprising a base portion, a pair of leg portions, and a limited portion of reduced cross-sectional area intermediate said leg portions and opposite said base portion, the crystalline structure of said limited core portion permanently being relatively strained with respect to that of the other core portions to provide low permeability therein relative to said other core portions.

9. A transducer head comprising a continuous core, said core consisting of a magnetic alloy having a crystalline structure, an external surface on said core adapted to be presented to a magnetic storage medium, and a limited data transfer region in said core including a portion of said external surface, said alloy providing a low-reluctance flux path outside said region, the crystalline structure of said alloy in said region permanently being relatively strained with respect to that in the remainder of said core and being adapted to force flux flowing in said core outwardly in the vicinity of said external surface.

10. A transducer head comprising a plurality of substantially identical, flat, superposed magnetic core laminations each forming a continuous loop, the actual permeability of a limited cross-sectional region in each of said laminations being permanently low with respect to the remainder of said lamination, each of said cross-sectional regions including an external surface portion, said external surface portions jointly forming a data transfer surface adapted to be presented to a magnetic storage medium, means for inducing flux flow in said laminations, the low permeability of the core material in said cross-sectional regions being adapted to force at least a portion of said flux out of each of said core laminations in the vicinity of said data transfer surface.

11. A transducer head comprising a plurality of substantially identical, flat, superposed magnetic core laminations insulated from each other and each being formed as a continuous loop, each of said laminations having a constricted cross-section in a limited region including an external surface portion, the actual permeability of the core material in said region being permanently low with respect to the remainder of said lamination, said external surface portions jointly forming a data transfer surface adapted to be presented to a magnetic storage medium, a winding disposed on said transducer head, means for energizing said winding to induce a flux flow in said core laminations, the reluctance of said core material in each of said regions being sufficiently high to force at least a portion of said flux out of said core laminations in the vicinity of said data transfer surface.

12. A transducer head comprising a plurality of substantially identical, flat, superposed permalloy core laminations insulated from each other, each of said core laminations having a base portion, a pair of leg portions and a core region of reduced cross-section intermediate said leg portions and opposite said base, said core region including a portion of an external surface of said lamination, the actual permeability of said core region being permanently low with respect to the remainder of said lamination, said external surface portions jointly forming a data transfer surface adapted to be presented to a magnetic storage medium, a winding disposed on said transducer head, means for energizing said winding to induce a flux flow in said core laminations, the reluctance of said core material in each of said regions being sufficiently high to force at least a portion of said flux out of said core laminations in the vicinity of said data transfer surface.

(References on following page)

References Cited by the Examiner

UNITED STATES PATENTS

| | | | |
|---|---|---|---|
| 2,531,642 | 11/1950 | Potter | 340—174.1 |
| 2,565,303 | 7/1950 | Garbarino | 29—155.61 X |
| 2,912,515 | 11/1959 | Lufcy | 179—100.2 |
| 2,979,572 | 4/1961 | Levin | 340—174.1 |
| 3,079,468 | 2/1963 | Morey | 179—100.2 |
| 3,105,965 | 10/1963 | Joannou | 340—174.1 |
| 3,106,617 | 10/1963 | Fox | 340—174.1 X |
| 3,117,367 | 1/1964 | Duinker et al. | 29—155.5 |
| 3,120,696 | 2/1964 | Lubkin | 29—155.5 |
| 3,127,592 | 3/1964 | Neergaard | 340—174.1 |
| 3,157,866 | 11/1964 | Lien | 340—174 |
| 3,217,305 | 11/1965 | Hanson | 340—174.1 |

OTHER REFERENCES

Di Marco, F. J.: Ferrite Transducing Head with Transmutative Portion, February, 1965, IBM Technical Disclosure Bulletin.

BERNARD KONICK, *Primary Examiner.*

TERRELL W. FEARS, IRVING L. SRAGOW, JAMES W. MOFFITT, *Examiners.*

M. K. KIRK, V. P. CANNEY, *Assistant Examiners.*